(12) United States Patent
Van Der Kraan et al.

(10) Patent No.: US 11,584,117 B2
(45) Date of Patent: Feb. 21, 2023

(54) MANUFACTURING LAYERED PRODUCTS

(71) Applicant: Airborne International B.V., 's-Gravenhage (NL)

(72) Inventors: Gerardus Adrianus Van Der Kraan, Nootdorp (NL); Mark Muilwijk, Barendrecht (NL)

(73) Assignee: Airborne International B.V., GB's-Gravenhage (NL)

( * ) Notice: Subject to any disclaimer, the term of this patent is extended or adjusted under 35 U.S.C. 154(b) by 127 days.

(21) Appl. No.: 15/733,445

(22) PCT Filed: Jan. 31, 2019

(86) PCT No.: PCT/NL2019/050059
§ 371 (c)(1),
(2) Date: Jul. 30, 2020

(87) PCT Pub. No.: WO2019/151856
PCT Pub. Date: Aug. 8, 2019

(65) Prior Publication Data
US 2021/0101382 A1    Apr. 8, 2021

(30) Foreign Application Priority Data
Jan. 31, 2018    (NL) .................................... 2020362

(51) Int. Cl.
*B32B 39/00*    (2006.01)
*B32B 38/18*    (2006.01)

(52) U.S. Cl.
CPC .......... *B32B 39/00* (2013.01); *B32B 38/1825* (2013.01)

(58) Field of Classification Search
CPC ........................... B32B 39/00; B32B 38/1825
See application file for complete search history.

(56) References Cited

U.S. PATENT DOCUMENTS 2,630,157 A    3/1953 Smellie
2,731,067 A    1/1956 Miller
(Continued)

FOREIGN PATENT DOCUMENTS

CH      350433 A     1/1961
CN    101740792 A    6/2010
(Continued)

OTHER PUBLICATIONS

International Search Report from PCT/NL2019/050059 dated Jan. 31, 2019.
(Continued)

*Primary Examiner* — George R Koch
*Assistant Examiner* — Christopher C Caillouet
(74) *Attorney, Agent, or Firm* — Adsero IP

(57) ABSTRACT

A manufacturing line for manufacturing layered products, comprising a plurality of manufacturing stations disposed along a transportation track of a transportation system. The plurality of manufacturing stations includes a number of layer dispensing stations, the transportation system comprising a plurality of product holders that are each arranged to be moved individually along the transportation track to visit manufacturing stations along the transportation track. The product holders are arranged to hold a stack of layers, and the transportation track includes a loop and a router. The router is arranged to route product holders to revisit manufacturing stations via the loop in the transportation track.

14 Claims, 1 Drawing Sheet

(56) References Cited

U.S. PATENT DOCUMENTS

| | | | |
|---|---|---|---|
| 3,457,962 A | 7/1969 | Shobert | |
| 3,567,542 A | 3/1971 | Jackson | |
| 4,385,952 A | 5/1983 | Futakuchi | |
| 4,734,146 A | 3/1988 | Halcomb | |
| 4,867,824 A | 9/1989 | Gill | |
| 4,943,334 A | 7/1990 | Medney | |
| 5,261,991 A | 11/1993 | Zackrisson | |
| 5,267,173 A * | 11/1993 | Tanizawa | G05D 1/0289 700/229 |
| 5,374,053 A | 12/1994 | Doucet | |
| 5,405,240 A * | 4/1995 | Uno | B65H 31/32 414/790.7 |
| 5,435,868 A | 7/1995 | Yu | |
| 6,047,756 A | 4/2000 | Uchida | |
| 7,238,250 B2 | 7/2007 | Kindervater | |
| 2003/0209312 A1 | 11/2003 | Hauber | |
| 2007/0107572 A1 | 5/2007 | Pommier | |
| 2007/0116999 A1* | 5/2007 | Kuramochi | B32B 37/223 429/534 |
| 2014/0166189 A1* | 6/2014 | Currie | B29D 30/0016 156/394.1 |
| 2015/0367622 A1 | 12/2015 | Adachi | |
| 2017/0021394 A1 | 1/2017 | Ohno | |

FOREIGN PATENT DOCUMENTS

| | | |
|---|---|---|
| CN | 105122335 A | 12/2015 |
| CN | 105358275 A | 2/2016 |
| DE | 4209496 | 9/1993 |
| DE | 102004031752 | 2/2005 |
| DE | 102011114015 A1 | 12/2012 |
| DE | 102013208778 A1 | 11/2014 |
| EP | 2589553 | 5/2013 |
| EP | 2730914 | 5/2014 |
| GB | 1291729 A | 10/1972 |
| GB | 1485586 | 9/1977 |
| JP | A 57069023 | 4/1982 |
| JP | U 56066423 | 10/1984 |
| JP | 61018636 | 1/1986 |
| JP | A 61002540 | 1/1986 |
| JP | 63167184 A | 7/1988 |
| JP | A 05031810 | 2/1993 |
| JP | A 11111893 | 4/1999 |
| WO | WO 1996-001183 | 1/1996 |
| WO | WO 1999-016595 | 4/1999 |
| WO | WO 2000-064663 | 11/2000 |
| WO | WO 2012-175151 | 12/2012 |
| WO | WO 2014-185100 | 11/2014 |
| WO | WO 2014-197098 | 12/2014 |
| WO | WO 2017-019680 | 2/2017 |

OTHER PUBLICATIONS

Chinese First Office Action, Chinese Application No. 201980019063.2, dated Apr. 18, 2022, English translation provided.

* cited by examiner

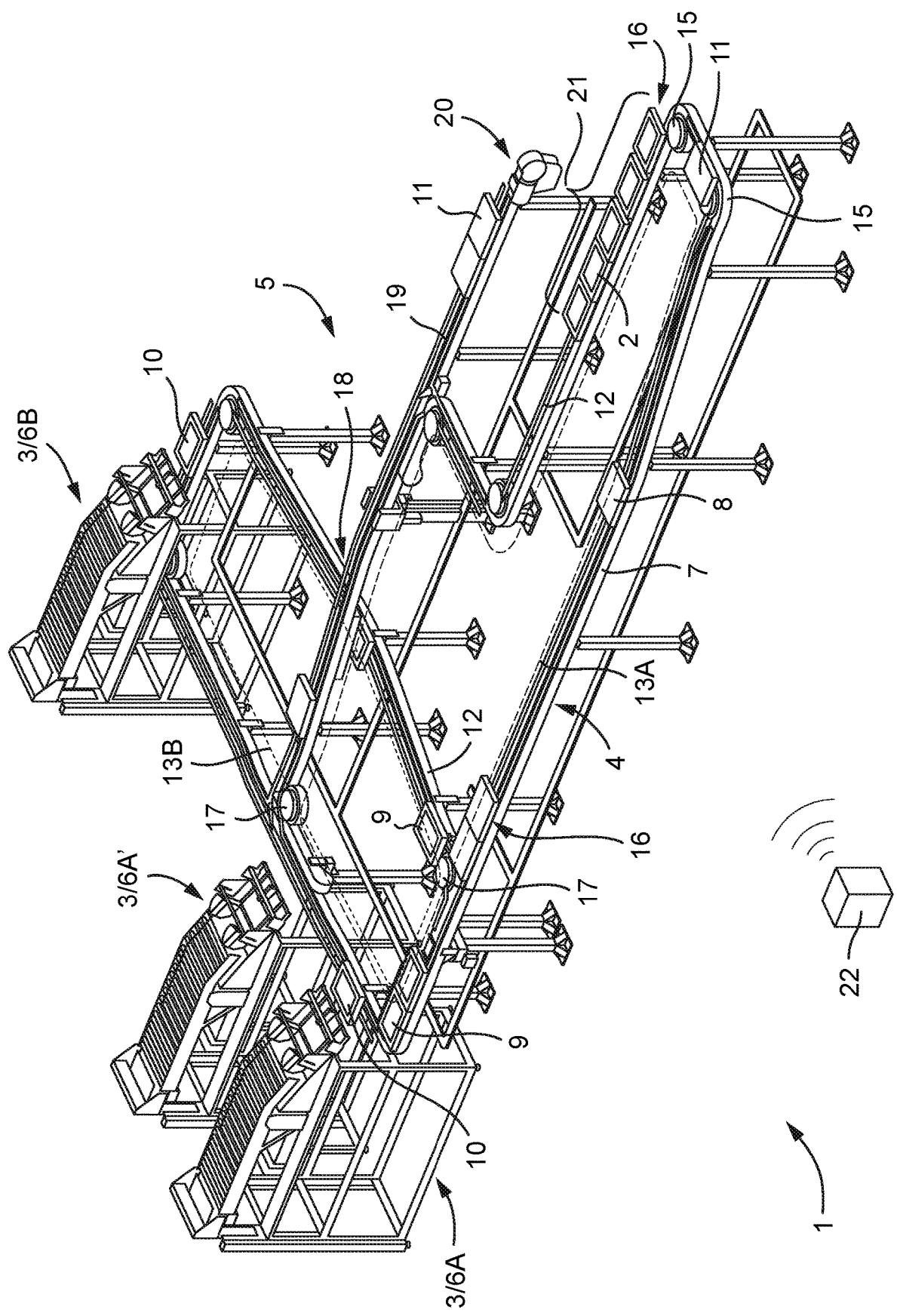

MANUFACTURING LAYERED PRODUCTS

RELATED APPLICATIONS

This application is a 35 U.S.C. § 371 national phase application of PCT/NL2019/050059 (WO 2019/151856), filed on Jan. 31, 2019, entitled "Manufacturing Layered Products", which application claims the benefit of Netherland Application No. 2020362, filed Jan. 31, 2018, which is incorporated herein by reference in its entirety.

The invention relates to manufacturing layered products, in particular to layered products including stacked sheets of fiber reinforced material as layers.

Such sheets or 'plies' may e.g. be sectioned off as a rectangular sheet from a relatively narrow tape web of fiber reinforced tape, e.g. an anisotropic unidirectional (UD) tape, or may be cut out from a broad roll of material in a desired shape. Such tapes or rolls may e.g. be produced by impregnating a planar layer of parallel, longitudinally extending continuous fibers with a matrix material. The fibers may e.g. include carbon fibers, aramid fibers or other types of reinforcement fibers, and the matrix material may e.g. include thermoplastic or thermosetting matrix material. The fiber reinforced material may be dry, but may also be wet or impregnated. In addition, the cut sheets may comprise a backing material.

During manufacture, the sheets or 'plies' are stacked in layers in a stack, typically a stack of sheets having mutually differing orientations. A layer can comprise a single sheet or may e.g. comprise two or more adjacent sheets. To form finished products, the stacked sheets are typically subjected to further processing steps, such as fixating the sheets within the stack, and subjecting the stack to a laminating or 'consolidating' process. As an alternative, the stacked sheets may be destacked and laid up in a mold, and subjected to (vacuum) pressure and/or heat. In such a process, the sheets form a laminated product, in particular a high strength, light weight consolidated fiber reinforced product.

Sheets of material are typically difficult to handle, in particular fiber reinforced sheets that have anisotropic stiffness. Strength, stiffness and rigidity are mainly provided by the reinforcement, whereas the matrix material typically binds the reinforcements together. As such, strength, stiffness and rigidity of the tape are mainly present along the fiber direction. Out of plane the anisotropic material has relatively low stiffness and is soft and pliable. The cut sheets are prone to fold transverse to the fiber direction and curl-up out of plane with respect to the fiber direction. Also, as the cut sheets are unfinished products, they are delicate and should be handled with care to prevent contamination, and loss of integrity. In addition, it is desired to vary the composition of the sheets in the stack, both in terms of types of sheets and in terms of the mutual fiber orientation of sheets in the stack.

Typically, sheets are therefore collected on a table and stacked by hand. With manual handling, integrity loss cannot always be avoided. As an alternative, ply picking robots have been proposed. Although useful for many applications, ply pickers are expensive and relatively slow.

The invention aims to alleviate at least some of the above mentioned disadvantages. In particular, the invention aims to provide a means and a way for stacking sheets, with which the cost efficiency and handling speed of the cut sheets can be increased, and/or with which quality loss of the sheets during handling can be reduced. In particular, the invention aims to provide increased output of stacked sheets, keep or improve control of sheet handling and prevention of contamination, as well as to allow variation of the sheets in the stack.

Thereto, the invention provides for a manufacturing line for manufacturing layered products, comprising a plurality of manufacturing stations disposed along a transportation track of a transportation system, the plurality of manufacturing stations including a number of layer dispensing stations, the transportation system comprising a plurality of product holders that are each arranged to be moved individually along the transportation track to visit manufacturing stations along the transportation track, which product holders are arranged to hold a stack of layers, wherein the transportation track includes a loop and a router, and wherein the router is arranged to route product holders to revisit manufacturing stations via the loop in the transportation track.

By providing a manufacturing line with a plurality of stations that include layer dispensing stations disposed along a transportation track with individually movable product holders that are arranged to hold a stack of layers, output of stacked sheets can be increased, while control of sheet handling and prevention of contamination can be maintained or improved. By providing a transportation track that includes a loop and a router, and by arranging the router to route product holders to revisit manufacturing stations via the loop in the transportation track, the composition of the sheets in the stack may be varied relatively easily, both in terms of types of sheets and in terms of the mutual orientation of sheets in the stack, in particular without the need to provide many manufacturing stations. The router may be arranged to control the product holders on the transportation track in different ways. The router may e.g. be arranged to—simultaneously, consecutively or overlappingly—move several product holders from one manufacturing station to another during a time for moving, and may be arranged to keep several product holders at a manufacturing station during a time for dispensing sheets, and may be arranged to park several product holders during a time for waiting. The time may be controlled in time slots or 'tacts' by the router, so as to allow for moving, dispensing and waiting during synchronized intervals. Alternatively, product holders may be controlled to be moved, kept or held independently in its own designated time.

The product holders may be provided as simple moving platforms, but may e.g. also comprise cradles to hold a stack of layers in alignment. Thereto, the cradle may comprise aligners to guide sheets or layers dispensed from respective layer dispensing stations so that the sheets can be positioned accurately, and be aligned neatly into the stack, e.g. for efficient stacking. The cradle may further comprise lateral supports to support the stack and/or keep beneficial alignment of accurately positioned and aligned sheets in the stack during transportation of product holders along the transportation track.

By arranging the transportation track to include a plurality of loops, each loop including of stations, the flexibility of the routing of the product holders along the various stations may be increased.

By routing product holders to visit a mutually different sequence of manufacturing stations along the transportation track, the flexibility of composition of the stack may be increased. By routing product holders to skip one or more manufacturing stations along the transportation track, manufacturing flexibility and output may be increased.

Advantageously, the transportation track includes a conveyor on which the product holders are conveyed. The transportation track may as an alternative e.g. be arranged as a path along which the product holders move under their own propulsion and/or motive power.

By arranging at least one layer dispensing station to dispense a controlled number of sheets per visit, the output may be increased. For example, during one visit several identical sheets may be placed on top of each other in the stack with the same orientation. Also, several sheets may be placed next to each other, or may be placed to overlap partially.

Advantageously, the plurality of manufacturing stations may include at least one of: a quality inspection station to inspect a quality of layer or stack of layers, a fixing station for affixing layers of a stack to each other, an aligning station for aligning layers of a stack, a trimming station for trimming a stack of layers, a buffering station for buffering one or more product holders, an entry station for entry of a product holder into the transportation track, an exit station for exit of a product holder from the transportation track, a discharge station for discharging a stack of layers from a product holder.

By arranging the plurality of manufacturing stations to include at least one other station for including items under, in or on a stack of layers, the flexibility of composition of the stacks may be further increased. Such other station may e.g. be an embedding station for embedding objects in a stack of layers, or a cover station for providing a cover to a bottom or top of a stack of layers. For example, a decorative or protective top- or bottom sheet may optionally be provided that bonds to the stack, but that is not fiber reinforced, e.g. a glossy thermoplastic sheet, or a metal film sheet. Also, optionally a sheet may be added in the stack in which an electronic component is integrated, e.g. an antenna, or a printed circuit to embed the component in the stack.

By arranging at least one of the layer dispensing stations to dispense one or more planar sheets, in particular rectangular sheets, use may be made of sheets that are sectioned from a web of tape, in particular unidirectional fiber reinforced sheets. Such sheets may be efficiently dispensed along their fiber orientation.

By rotatably arranging the product holders relative to the transportation track, the orientation of a stack of layers held on the product holder relative to the station may be manipulated. This way, the sheets may be dispended by the station in an orientation that is advantageous for the dispensing operation, e.g. in a direction along the fibers in a unidirectional fiber reinforced sheet, while at the same time the stack is positioned to receive the sheet in the desired orientation in the stack.

Efficiently, the sheets dispensed from at least some of the stations are of equal size, e.g. several stations may dispense sheets having the same rectangular shape, e.g. sheets including fiber reinforced material having a bundle of parallel longitudinally oriented fibers embedded in a thermosetting or thermoplastic matrix material. The sheets can be of various shapes. They can be cut or sectioned off perpendicularly to the length of the tape, so that the cut or sectioned sheets have a substantially rectangular shape. Such sheets are preferred. However, the sheets can also be cut or sectioned off obliquely to the length of the tape, so as to form a sheet that is shaped as a triangle, trapezoid or parallelepiped, and the sheets can also be cut or sectioned off with a curved cutting line. Also, the sheets may be cut out in any shape from a web of material, e.g. using a numerically controlled cutter. It is of course also possible, by using rolls of tape having off-axis fiber orientations or cross-ply tape, to cut or section off sheets with correspondingly different fiber orientations.

By including at least two layer dispensing stations that are arranged to dispense one or more sheets of fiber reinforced material that include a bundle of parallel longitudinally oriented fibers embedded in a thermosetting or thermoplastic matrix material, the arrangement of the dispensing stations can be set up so that at the dispensing stations the sheets are dispensed into the stack with mutually different fiber orientations.

When in one station the sheets are dispensed onto the stack as rectangular sheets having the fibers oriented in length direction of the rectangle, and in the other station the sheets are dispensed into the stacks as rectangular sheets of the same length and width having the fibers oriented in width direction of the rectangle, efficient use may be made of two types of sheets having unidirectional fibers, of which the length of one sheet corresponds to the width of the other sheet, and vice versa.

By providing at least two layer dispensing stations that are arranged to dispense one or more sheets of fiber reinforced material that include a bundle of parallel longitudinally oriented fibers embedded in a thermosetting or thermoplastic matrix material, the arrangement of the dispensing stations may be set up so that at the dispensing stations the sheets are dispensed into the stack with mutually the same fiber orientations. For example, the dispensing stations dispense the sheets along their respective fiber orientation and the stack may be rotated to alternately receive dispensed sheets having mutually differing fiber orientations. This way, the stack can comprise sheets having mutually differing orientations.

The invention also relates to a method of manufacturing layered products, wherein a plurality of product holders are each moved along a transportation track to visit manufacturing stations along the transportation track, and wherein the product holders are routed to revisit manufacturing stations.

The invention further relates to a layered product including a stack of substantially planar, rectangular sheets mutually having the same length and width, sheets in the stack being of a fiber reinforced material that includes a bundle of parallel longitudinally oriented fibers embedded in a thermosetting or thermoplastic matrix material, in which the fibers of a number of sheets in the stack are arranged at mutually different orientations, and in which a number of superimposed sheets in the stack are arranged at mutually identical orientations. Advantageously, the layers in the stack are mutually affixed so as to form a green product for a subsequent pressing operation.

Further advantageous aspects of the invention are set out in the description and appended claims.

It will be clear to the skilled person that the technical features of the present invention elucidated in the above paragraphs can be advantageously used for stacking sheets not only each alone but also in any possible combination. The technical features described in the paragraphs can be isolated from the context, and the isolated technical features from the different paragraphs can be combined. Such combinations are herewith specifically disclosed in this description.

The invention will be further elucidated on the basis of a non limiting exemplary embodiment, which is represented in a drawing. In the drawing, FIG. 1 shows a schematic perspective view of a manufacturing line for manufacturing layered products.

It is noted that the drawing is only a schematic representation of a preferred embodiment of the invention.

Referring to FIG. 1, a schematic perspective view is shown of a manufacturing line 1 for manufacturing layered products 2. The manufacturing line comprises three manufacturing stations 3 disposed along a transportation track 4 of a transportation system 5. In this example, all manufacturing stations 3 are layer dispensing stations 6a, 6a', 6b. The transportation track 4 includes a rail 7 along which the layer dispensing stations 6a, 6b are placed. The transportation system 5 comprises a plurality of product holders 8 that are arranged to hold a stack 9 of layers 10. The stack 9 includes stacked sheets of fiber reinforced material as layers 10. A layer 10 may include a single sheet of fiber reinforced material, but may also include several adjacent sheets of fiber reinforced material. The stack 9 may include layers 10 that include other material than fiber reinforced material. The stack 9 may further include layers 10 that are comprised of material other than fiber reinforced material, e.g. a metal foil or a film of thermoplastic material without fiber reinforcement.

In this example, the product holders 8 include flat horizontal transport planes 11, but in another embodiment they may include cradles to keep the stack 9 of layers 10 mutually aligned. The product holders 8 are movably supported on the rail 7 via a base portion (not shown). The product holders 8 are each arranged to be moved individually along the transportation track 5 to visit the manufacturing stations 3, in this example the layer dispensing stations 6a, 6a', 6b along the transportation track 4. The rail 7 includes a drive element 12, such as a chain or wire, that can be become engaged with the base portion of the product holder 8 so that it can be selectively moved along the rail 7. The drive element 12 may in this embodiment move along the rail 7 in two directions, but in another embodiment may be arranged to move in one direction along the rail 7 only. The transportation track 4 in this example includes a loop 13 that includes two intersecting loops 13a, 13b. Each loop 13a, 13b includes at least one layer dispensing station 6a, 6a', 6b as manufacturing station. In this example, the loops 13a, 13b in the transportation track 4 are formed because the rail 7 is provided with rail sections 14 that are connected via a number of bends 15, stops 16, switchable intersections 17 and an elevated crossing 18. The transportation track 4 is also provided with a rail section 14 that forms a leg 19 that extends to an entry/exit station 20. The leg 19 also includes a buffer 21. The drive element 12 may in this example be driven along the rail sections 14 in opposing directions.

The manufacturing line 1 further includes a router 22. In this embodiment, the router 22 is embodied as a wireless computerized controller that can control movement of the drive elements 12, engagement of the base of the individual product holders 8 with the drive elements 12, activate and deactivate the stops 16, and can switch the intersections 17.

As shall be explained further, the router 22 is arranged to route product holders 8 to revisit the manufacturing stations via the loops 13a, 13b in the transportation track 4. In addition, the layer dispensing stations 6 are arranged to dispense a controlled number of layers, in particular fiber reinforced sheets, per visit. This is in this example also controlled by the router 22. In another embodiment this may be controlled by a manufacturing controller, that e.g. also controls the router 22.

The layer dispensing stations 6a, 6a', 6b are arranged to dispense one or more planar sheets, e.g. planar rectangular sheets, to form layers of the stack. In this embodiment, they are configured for dispensing fiber reinforced sheets. In this embodiment, a single dispensed sheet forms a single, complete layer 10. The sheets dispensed from the layer dispensing stations 6a, 6a', 6b are of equal size, and include fiber reinforced material having a bundle of parallel longitudinally oriented fibers embedded in a thermosetting or thermoplastic matrix material. The arrangement of the layer dispensing stations 6 is such that at the layer dispensing stations 6a, 6a' and 6b respectively the sheets are dispensed into the stack to be formed on the product holder 8 with mutually different fiber orientations. In particular, at one layer dispensing station 6a, 6a' the sheets are dispensed onto the stack 9 to be formed on the product holder 8 as rectangular sheets having the fibers oriented in length direction of the rectangle, and in the other layer dispensing station 6b the sheets are dispensed into the stacks as rectangular sheets of the same length and width having the fibers oriented in width direction of the rectangle. The sheets in the layer dispensing station 6a are of a first quality, while the sheets in the layer dispensing stations 6a and 6b are of a second quality.

In use, the plurality of product holders 8 are each moved along a transportation track 4 to visit the manufacturing stations 3, in particular the layer dispensing stations 6a, 6a', 6b along the transportation track 4, and the product holders 8 are routed by the router 22 to revisit layer dispensing stations 6a, 6a', 6b via the loops 13a, 13b in the transportation track 4. Product holders 8 may be routed to visit a mutually different sequence of the layer dispensing stations 6a, 6a', 6b along the transportation track 4. Also, some product holders 8 may be routed to skip one of the layer dispensing stations 6a, 6a', 6b along the transportation track 4.

For example, a product holder 8 with an empty transport plane 11 may enter the manufacturing line 1 via entry/exit station 20, and may be controlled by the router 22 to enter the loop 13 via leg 19 by engagement of its base by drive element 12. It may then proceed to a first intersection 17 at the end of the leg 19, which is switched by router 22 to make the product holder 8 turn left. The product holder 8 may then proceed to layer dispensing station 6a where it receives a bottom sheet of a high quality that forms the first layer 10 of a stack 9 to be formed. Next it may circulate along loop 13b, where a second sheet is disposed to form a second layer 10 of a stack 9 to be formed, this second sheet is of normal quality, and the fibers in the second sheet are oriented substantially perpendicularly to the fibers in first sheet. Next, the product holder 8 may be controlled by the router 22 to proceed along the loop 13b and to stop at layer dispensing station 6a', where a third sheet is dispensed onto the stack 9 to form a third layer 10. The third layer 10 is formed by a sheet of normal quality that has substantially the same fiber orientation as the first sheet dispensed by station 6a. The router 22 may control the product holder 8 to loop along loop 13b and to skip layer dispensing station 6a, and to revisit layer dispensing stations 6b and 6a' to alternatively receive sheets until an $8^{th}$ sheet of normal quality has been dispensed by layer dispensing station 6b to form an $8^{th}$ layer 10. Then, the router 22 may control the product holder 8 to proceed along loop 13b to layer dispensing station 6a, where it controls layer dispensing station 6a to dispense a top sheet of high quality onto the stack 9 to form a $9^{th}$ and final layer 10. Product holders 8 of which the stacks 9 are complete may e.g. be routed by router 22 to pass through loop 13a until they reach stop 16 to join a buffer 21. At buffer 21, the quality may be checked by a manufacturing station that is not shown. The router 22 may then route the product holders 8 with finished products 2 to continue through loop 13a, and to proceed to entry/exit station 20 via leg 19.

If desired, at a layer dispensing station 6 several sheets may be dispensed on top of each other to add several layers 10 at a time in one visit.

Such sheets may be dispensed consecutively. As an alternative, several sheets may be dispensed at a time, e.g. double sheets. In an alternative arrangement, a layer dispensing station 6 may dispense several sheets next to each other to form a single layer in one visit. This may be done by dispensing two parallel sheets at a time, or by consecutively dispensing sheets that are placed next to each other. It shall be clear that the router 22 can control the product holders 8 to proceed through the various loops 13 and to revisit and skip the layer dispensing stations 6a, 6a', 6b along the transportation track 4 to come to stacks 9 having many different compositions of layers 9. For example, the router 22 may control the product holders 8 to loop around loop 13a only, e.g. to receive a bottom layer 10 from layer dispensing station 6a, to receive six layers 10 from layer dispensing station 6a', and a final top layer 10 from layer dispensing station 6a.

As for the scope of this disclosure, it is pointed out that technical features which have been specifically described may be susceptible of a functional generalization. It should also be considered part of this disclosure that product holders visit manufacturing stations along the transportation track only once, i.e. without revisiting stations. In such case a loop may be passed through once by a product holder, and the loop need not be closed. The router may then have a limited task. The router may then e.g. control the movement of the product holders along a transportation track that forms a line, and may e.g. control the bypassing of manufacturing stations, and the dispensing of layers onto the stack by the dispensing stations. Furthermore, it is pointed out that—as far as not explicitly indicated—such technical features can be seen separately from the context of the given exemplary embodiment, and furthermore can be seen separately from the technical features with which they cooperate in the context of the example.

As for the scope of protection, it is pointed out that the invention is not limited to the exemplary embodiment represented here, and that many variants are possible. For example, other transportation systems may be applied for conveying the product holders, e.g. automatically guided vehicles. Also, the manufacturing line may further include other stations, e.g. a quality inspection station to inspect a quality of layer or stack of layers, a fixing station for affixing layers of a stack to each other, an aligning station for aligning layers of a stack, a trimming station for trimming a stack of layers. Further, the manufacturing line may include other stations for including items under, in or on a stack of layers, e.g. an embedding station for embedding objects in a stack of layers, or a cover station for providing a cover to a bottom or top of a stack of layers. Such variants will be clear to the skilled person and are understood to fall within the scope of the invention as set forth in the following claims.

LIST OF REFERENCE SIGNS

1 Manufacturing line
2 Layered product
3 Manufacturing station
4 Transportation track
5 Transportation system
6a, 6a', 6b Layer dispensing station
7 Rail
8 Product holder
9 Stack
10 Layer
11 Transport plane
12 Drive element
13, 13a, 13b Loop
14 Rail
15 Bend
16 Stop
17 Intersection
18 Crossing
19 Leg
20 Entry/exit station
21 Buffer
22 Router

The invention claimed is:

1. A manufacturing line for manufacturing layered products, comprising a plurality of manufacturing stations disposed along a transportation track of a transportation system, the plurality of manufacturing stations including a number of layer dispensing stations, the transportation system comprising a plurality of product holders that are each arranged to be moved individually along the transportation track to visit manufacturing stations along the transportation track, which product holders are arranged to hold a stack of layers, wherein the transportation track includes a loop and a router, and wherein the router is arranged to route product holders to revisit manufacturing stations via the loop in the transportation track.

2. The manufacturing line according to claim 1, in which the transportation track includes a plurality of loops, each loop including a different set of stations.

3. The manufacturing line according to claim 1, in which the at least one layer dispensing station is arranged to dispense a controlled number of sheets per visit.

4. The manufacturing line according to claim 1, in which at least one of the layer dispensing stations is arranged to dispense one or more planar sheets.

5. The manufacturing line according to claim 1, in which the sheets dispensed at least some of the stations are of equal size.

6. The manufacturing line according to claim 1, in which the sheets include fiber reinforced material having a bundle of parallel longitudinally oriented fibers embedded in a matrix material.

7. The manufacturing line according to claim 1, including at least two layer dispensing stations that are arranged to dispense one or more sheets of fiber reinforced material that include a bundle of parallel longitudinally oriented fibers embedded in a matrix material, the arrangement of the dispensing stations being set up so that at the dispensing stations the sheets are dispensed into the stack with mutually different fiber orientations.

8. The manufacturing line according to claim 7, in which at least at one station the sheets are dispensed onto the stack as rectangular sheets having the fibers oriented in length direction of the rectangle, and in the other station the sheets are dispensed onto the stacks as rectangular sheets of the same length and width having the fibers oriented in width direction of the rectangle.

9. The manufacturing line according to claim 1, including at least two layer dispensing stations that are arranged to dispense one or more sheets of fiber reinforced material that include a bundle of parallel longitudinally oriented fibers embedded in a matrix material, the arrangement of the layer dispensing stations being set up so that at the layer dispensing stations the sheets are dispensed onto the stack with mutually the same fiber orientations.

10. The manufacturing line according to claim 1, in which product holders of the plurality of product holders are routed to visit a mutually different sequence of manufacturing stations along the transportation track.

11. The manufacturing line according to claim 1, in which product holders of the plurality of product holders are routed to skip one or more manufacturing stations along the transportation track.

12. The manufacturing line according to claim 1, in which the plurality of product holders are each rotatably arranged relative to the transportation track, so as to manipulate the orientation of a stack of layers held on a respective product holder of the plurality of product holders relative to the station.

13. The manufacturing line according to claim 1, in which the transportation track includes a conveyor on which the plurality of product holders are conveyed.

14. A method of manufacturing layered products, wherein a plurality of product holders are each moved along a transportation track to visit sheet dispensing stations along the transportation track, and wherein the product holders are routed on a looped portion of the transportation track by a router arranged to route the product holder to revisit sheet dispensing stations, wherein a stack of sheets can be built up as desired.

\* \* \* \* \*